March 31, 1936.　　　B. E. GAGNON　　　2,036,172
CORD AND CHAIN COUPLING
Filed Nov. 15, 1935
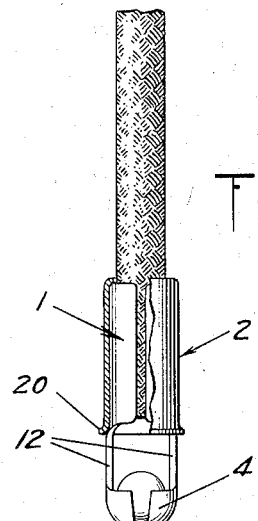
Fig.1.
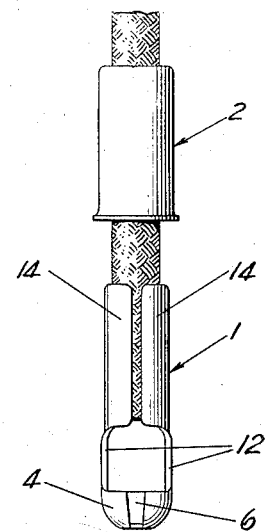
Fig.2.
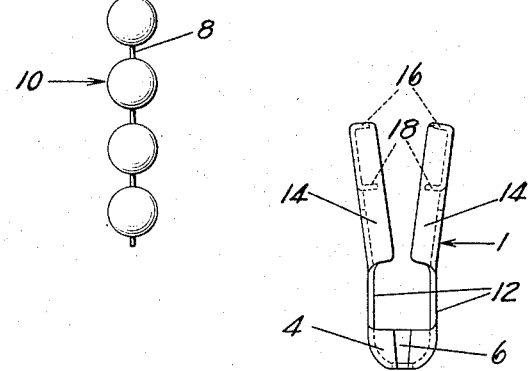
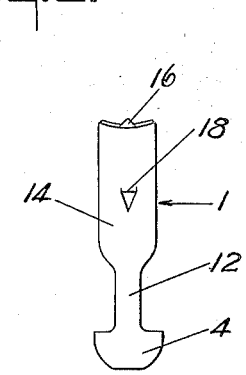
Fig.3.　　　Fig.4.
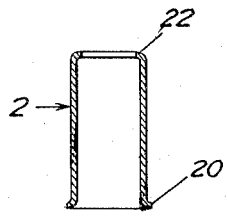
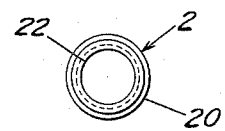
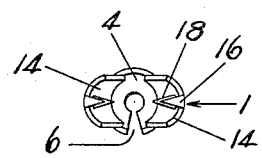
Fig.6.　　Fig.7.　　Fig.5.
INVENTOR
BERNARD E. GAGNON
BY HIS ATTORNEYS
*Howson and Howson*

Patented Mar. 31, 1936

2,036,172

UNITED STATES PATENT OFFICE 2,036,172

CORD AND CHAIN COUPLING

Bernard E. Gagnon, Bridgeport, Conn., assignor to The Bead Chain Manufacturing Company, Bridgeport, Conn., a corporation of Connecticut Application November 15, 1935, Serial No. 50,021

5 Claims. (Cl. 24—116)

This invention relates to couplings and more particularly to couplings for joining a cord to a chain and it is an object of this invention to provide an improved device of the type described for use in connecting cords to chain of the bead or ball type which shall be of simple construction, readily manufactured, reliable in operation and which may be readily and quickly applied or removed without the use of tools.

In the drawing, in which a preferred embodiment of the device is illustrated,

Fig. 1 is a view in elevation showing the device assembled with a cord and a bead chain to unite the same, part of the device being broken away to show other parts more clearly;

Fig. 2 is a view in elevation showing the device assembled with a cord but before its sleeve is positioned to secure the device to the cord;

Figs. 3 and 4 are views in elevation, taken at right angles to each other, of the coupling member shown detached;

Fig. 5 is a view in end elevation looking at the end which receives the cord, of the coupling member shown in Figs. 3 and 4; and Fig. 6 is a vertical section and Fig. 7 an end elevation of the sleeve used with the coupling member of Figs. 3 and 4.

As shown in the drawing, a coupling constructed in accordance with this invention comprises a coupling member 1 and a sleeve 2. The coupling member 1 comprises a substantially hemi-spherical cup portion 4, slotted as at 6 to permit the passage of a connection link 8 so that the end bead of a bead chain 10 may be seated in the cup portion 4. Arms 12 project from diametrically opposite portions of the rim of the cup portion 4 and the upper portions of the arms 12 are shaped to form semi-circular troughs, as at 14, the inside diameters of which are substantially that of the cord with which the connector is to be used. At their outer ends each trough portion 14 is provided with an inwardly directed prong 16 formed integral therewith and so positioned that the prongs are diametrically opposite to each other and intermediate their length and in line with the prongs 16 additional prongs 18 are struck up from the trough portions 14.

The sleeve 2 is a tubular member slightly longer than the trough portions 14 with an outwardly turned flare or flange 20 at one end and an inwardly turned flange 22 at the other. The inner diameter of the sleeve is sufficient to permit the sleeve to pass over the trough portions 14 while holding the trough portions firmly in contact with a cord received therein. The flange 22 projects inwardly sufficiently to engage the outer end of the trough portions 14 and serve as a stop limiting the movement of the sleeve on the coupling but leaves an opening of sufficient diameter to pass the cord with which the coupler is associated.

In applying the device, the cord is inserted in the sleeve 2 from the end with the flange 22 and then inserted between the trough portions 14 as far as the inner ends of the trough portions. With the sleeve 2 removed the trough portions 14 normally spread outwardly as shown in Fig. 3 so the cord may be readily inserted past the prongs 16 and 18. With the cord inserted between the trough portions, the trough portions are forced together, engaging the prongs 16 and 18 in the cord, and the sleeve then slipped from the cord over the trough portions until stopped by engagement of the flange 22 with the ends of the trough portions. The bead chain is then attached by sliding the end link 8 of the chain through the slot 6 so as to seat the end ball of the chain in the cup portion 4.

What I claim is:—

1. A connector comprising a plurality of trough-shaped portions cooperating in receiving a cord, means fitting said trough-shaped portions for holding said portions engaged with the cord, and a cup-shaped portion attached to said trough-shaped portions, said cup-shaped portion having an opening for engaging a bead chain.

2. A connector comprising a plurality of trough-shaped portions cooperating in receiving a cord, means fitting said trough-shaped portion for holding said portions engaged with the cord, a cup-shaped portion split to receive a bead chain link and arms joining said cup and trough-shaped portions.

3. A connector comprising a plurality of trough-shaped portions cooperating in receiving a cord, means fitting said trough-shaped portion for holding said portions engaged with the cord, said trough-shaped portions having substantially flat extensions, and means joining said extensions for engaging a bead chain.

4. A connector comprising a plurality of arms having flat and trough-shaped portions, means fitting said trough-shaped portions to hold said portions engaged with a cord therebetween and means joining said flat portions shaped to engage a bead chain.

5. A connector comprising a plurality of trough-shaped portions forming a split sleeve to receive a cord, a sleeve fitting said trough-shaped portions for holding said trough-shaped portions engaged with the cord, and a cup-shaped portion attached to said trough-shaped portions, said cup-shaped portion being split for the insertion of a bead chain link.

BERNARD E. GAGNON.